United States Patent
Sheehan

[11] Patent Number: 5,882,726
[45] Date of Patent: Mar. 16, 1999

[54] LOW-TEMPERATURE DENSIFICATION OF CARBON FIBER PREFORMS BY IMPREGNATION AND PYROLYSIS OF SUGARS

[75] Inventor: James E. Sheehan, deceased, late of San Diego, Calif., by Jane Sheehan, executor

[73] Assignee: MSNW, Inc., San Marcos, Calif.

[21] Appl. No.: 771,530

[22] Filed: Dec. 23, 1996

Related U.S. Application Data

[60] Provisional application No. 60/009,477, Jan. 2, 1996.
[51] Int. Cl.$^6$ ....................................................... B05D 3/02
[52] U.S. Cl. .......................... 427/228; 427/379; 427/294; 427/384
[58] Field of Search .................................. 427/228, 294, 427/379, 384

[56] References Cited

U.S. PATENT DOCUMENTS

| | | |
|---|---|---|
| 0,935,180 | 9/1909 | Williamson . |
| 0,963,291 | 7/1910 | Horton . |
| 2,880,120 | 3/1959 | Pelle ......................................... 427/228 |
| 3,026,214 | 3/1962 | Boyland et al. . |
| 3,174,895 | 3/1965 | Gibson et al. . |
| 3,233,014 | 2/1966 | Bickerdike et al. . |
| 3,238,054 | 3/1966 | Bickerdike et al. . |
| 3,462,289 | 8/1969 | Rohl et al. ............................... 427/228 |
| 4,472,460 | 9/1984 | Kampe et al. . |

*Primary Examiner*—Janyce Bell
*Attorney, Agent, or Firm*—Frost & Jacobs LLP

[57] ABSTRACT

An improved method for producing low-cost carbon-carbon composites based on melt-impregnation of carbonaceous fiber preforms with low-melting point sugars is provided. Sugars such as fructose, ribose and sucrose are provided as impregnants via either ambient pressure or vacuum processing. Subsequent pyrolysis in air by heating to temperatures in the 325° C. to 350° C. range results in almost complete decomposition of the sugars to carbon. Frothing during the sugar melt-impregnation and pyrolysis process is minimized by the use of extended periods of isothermal pyrolysis or by the use of a catalyst. A hybrid process combining sugar melt-impregnation and pyrolysis with carbonaceous resin impregnation and pyrolysis is also provided as a densification enhancement. Three sugar melt-impregnation and pyrolysis cycles followed by a furfural alcohol impregnation cycle and a final sugar melt-impregnation cycle reduce the pore volume from sixty per cent in the preform to twenty-six per cent in the densified composite.

21 Claims, 1 Drawing Sheet

LOW-TEMPERATURE DENSIFICATION OF CARBON FIBER PREFORMS BY IMPREGNATION AND PYROLYSIS OF SUGARS

BACKGROUND OF THE INVENTION

This is a non-provisional application based upon an earlier-filed provisional application, Ser. No. 60/009,477 filed Jan. 2, 1996. The present invention relates generally to composite materials containing fibers and a carbon matrix, and more particularly to a reduced-temperature, low-cost process for fabricating carbon fiber-carbon matrix composites of high density.

Carbon fiber-carbon matrix (C—C) composites are a class of lightweight, very high-temperature materials that have a variety of niche applications in the aircraft and aerospace industries. Among these applications, rocket nozzles, reentry nosetips and heat shields, and aircraft brake disks are the most prominent.

C—C composites are fabricated in general by a two-step method in which a porous carbonaceous fiber preform is first assembled by a variety of textile processes that either directly yield useful shapes or produce bulk materials that are subsequently shaped. A typical preform consists of ten to eighty plies of woven carbon fibers. The fibers can be woven into fairly simple two-dimensional geometries or more complex three-dimensional braid architectures, depending upon the configuration and desired properties of the finished C—C composite part. Second, the carbon matrix is formed by impregnating a carbon matrix precursor material into the preform by either repeated cycles of liquid impregnation and pyrolysis or continuous processing by simultaneous gas infiltration and pyrolysis.

During the liquid impregnation and pyrolysis method, a carbon matrix precursor material, such as a fluid carbonaceous resin or pitch, is impregnated into the porous carbonaceous fiber preform by injection, soaking, or a similar technique. This impregnated preform is then pyrolyzed by heating it to temperatures sufficient to thermally decompose the precursor material to leave behind only carbon.

In contrast, during the gas infiltration technique, of which chemical vapor infiltration (CVI) is an example, a porous carbonaceous fiber preform is placed into a furnace filled with a heated flowing hydrocarbon gas such as methane, propane, or propylene. This gas serves as the carbon matrix precursor material. As the gas slowly diffuses into the porous carbonaceous fiber preform, the gas decomposes, or pyrolyzes, to form carbon.

Several patents are illustrative of this basic processing technology. For instance, U.S. Pat. No. 3,174,895 to Gibson, et al., dated Mar. 23, 1965, discloses a method of fabricating artificial carbon or graphite bonded cloth laminates that have flexibility, strength, and electrical property advantages over monolithic artificial graphites. Graphite cloth sheets are painted with a carbonaceous binder, stacked, molded, cured together under pressure and baked to form the laminates. U.S. Pat. No. 3,233,014 to Bickerdike, et al., dated Feb. 1, 1966, and U.S. Pat. No. 3,238,054 to Bickerdike, et al., dated Mar. 1, 1966, disclose a method for fabricating fibrous carbon articles by pyrolytic deposition in which a fibrous preform is heated in a stream of gas containing a gaseous carbon compound so that the gas decomposes to deposit carbon within the preform to form the matrix. Alternatively, the carbon matrix can be formed by a process in which a synthetic carbonaceous resin, such as a furfural alcohol, impregnates the preform and the resin is subsequently polymerized and carbonized. U.S. Pat. No. 3,462,289 to Rohl, et al., dated Aug. 19, 1969, teaches a method of producing high density reinforced carbon and graphite bodies whereby a carbon or graphite fiber preform is made into a shape and impregnated in vacuum by a suitable carbonaceous resin, followed by pressure curing and baking. A low-cost method to fabricate C—C composites by the use of colloidal graphite impregnation techniques is taught in a pending U.S patent application based upon an earlier-filed provisional application, Ser. No. 60/008,112, by James E. Sheehan, filed Oct. 29, 1996.

Conventionally, resins such as furfural alcohol and phenol formaldehyde (phenolic), as well as pitches derived from both coal and petroleum are used as carbon precursor materials. The use of alternative precursor materials in processing graphitic articles is well known. For instance, U.S. Pat. No. 935,180 to Williamson, dated Sep. 28, 1909, and U.S. Pat. No. 963,291 to Horton, dated Jul. 5, 1910, teach the use of a solution containing a carbohydrate such as molasses to impregnate porous graphitic articles. U.S. Pat. No. 4,472,460 to Kampe, et al., dated Sep. 18, 1984, teaches the use of a liquid sugar solution to coat carbon black particles, which, upon pyrolysis, form a continuous coating of electrically conductive carbon char for use in gas diffusion electrodes. U.S. Pat. No. 3,026,214 to Boyland, et al., dated Mar. 20, 1962, teaches the use of solutions of purified sugar to impregnate carbon bodies in repeated high-temperature processing cycles. These art-described processes, which utilize sugar or other carbohydrates as carbon precursors, prefer that the sugar or carbohydrate be dissolved in either water or some other appropriate solvent.

Both the gas infiltration and liquid infiltration processing methods for C—C composites require prolonged and repeated processing at temperatures over 1000° C. in the absence of oxygen. Both techniques are slow and costly. Some CVI techniques can take as long as weeks or even months to produce a finished part, although advances in forced-flow technology have reduced this processing time. During some liquid impregnation and pyrolysis processes, the resin shrinks upon pyrolysis, so the entire impregnation and pyrolysis cycle must be repeated in order to properly densify the part. The number of cycles is determined by the density desired in the C—C composite article, which is in turn determined by the performance and cost requirements of the C—C composite article in application. For instance, a typical desired density for C—C brake disks ranges between approximately 1.5 $g/cm^3$ and 1.8 $g/cm^3$ while a typical desired density for rocket nozzles or nosetips ranges between approximately 1.7 $g/cm^3$ to 1.9 $g/cm.^3$ The method disclosed by U.S. Pat. No. 3,026,214 utilizing a sugar solution as a carbon precursor also requires pyrolysis under pressure to prevent frothing and similar high-temperature treatment in a non-oxidizing environment to achieve a high purity product. In addition, the use of sugars dissolved in water or other appropriate solvents for the techniques disclosed in the art is inefficient. These are significant factors that contribute to the high cost and complexity of processing C—C composites.

SUMMARY OF THE INVENTION

The present invention was completed to overcome the above-mentioned drawbacks. Accordingly, it is an object of the present invention to significantly reduce the cost and complexity of fabricating C—C composites.

It is another object of the present invention to eliminate the need for nonoxidizing high-temperature processing cycles necessary to fabricate C—C composites.

It is another object of the present invention to provide an efficient method for densifying carbonaceous fiber preforms by melt-impregnation with sugars of appropriate characteristics and pyrolyzing them at low temperatures in air at ambient pressure to form the carbon matrix of C—C composites.

It is a still further object of the present invention to provide a method for enhancing the density and other properties of C—C composites fabricated by a hybrid process combining a sugar melt-impregnation and pyrolysis process with a carbonaceous resin or pitch impregnation and pyrolysis process.

Additional objects, advantages, and other novel features of the invention will be set forth in part in the description that follows and in part will become apparent to those skilled in the art upon examination of the following or may be learned with the practice of the invention.

To achieve the foregoing and other objects, and in accordance with the purposes of the present invention as described herein, an improved low-temperature process for efficiently producing low-cost, high-density C—C composites by multiple cycles of sugar melt-impregnation and pyrolysis is provided.

Still other objects of the present invention will become apparent to those skilled in this art from the following description wherein there is described a preferred embodiment of this invention. As will be realized, the invention is capable of other different embodiments, and its several details are capable of modification in various, obvious aspects all without departing from the invention. Accordingly, the descriptions will be regarded as illustrative in nature and not as restrictive.

DETAILED DESCRIPTION OF THE INVENTION

Figure 1:
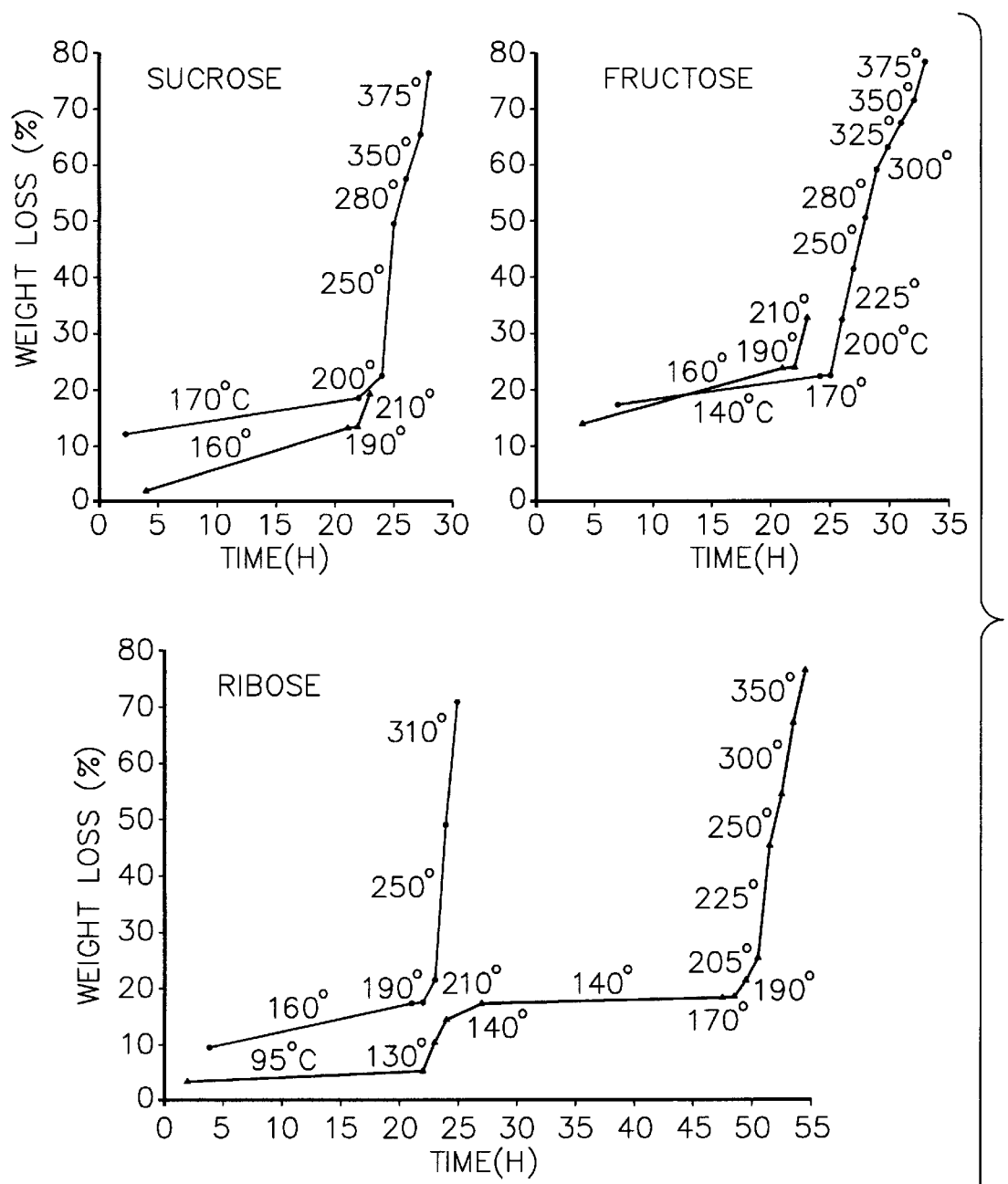
FIG. 1 shows thermal decomposition plots for the following sugars: sucrose, fructose, and ribose.

Reference will now be made in detail to the preferred embodiment of the present invention. As will be clearly illustrated by the examples which follow, the method of the invention stated in simple terms comprises the following steps: first, a porous carbonaceous fiber preform is melt-impregnated by burying the preform in a container filled with sugar granules or powder and then heating in air or vacuum above the sugar melting point. Any suitable container that is inert to the sugar during thermal processing is adequate for this purpose. Second, the sugar within the melt-impregnated preform is pyrolyzed, or thermally decomposed to form carbon, by heating at low temperatures in air for prolonged periods. These two steps can be repeated as many times as necessary to achieve the desired density of the C—C composite, depending on the performance and cost requirements of the finished product in application. In general, three complete cycles of melt-impregnation and pyrolysis accomplish maximum densification of the preform. It has been demonstrated that sugar melt-infiltration and pyrolysis may be accomplished by using a number of sugars, including, but not necessarily limited to, sucrose, fructose, and ribose.

Comparison of Sugars With Traditional Carbon Precursors

Table 1 compares some important characteristics of the common precursors that are used to form the matrix of C—C composites by liquid impregnation and pyrolysis with those of three appropriate sugars. Melting point and specific gravity data were obtained from handbooks, carbon contents were calculated from the chemical formulae, and pyrolysis yields were taken from the literature or determined experimentally. The carbon density values (pyrolysis carbon yield per volume of precursor) were calculated using the specific gravity and pyrolysis carbon yield, decomposition values were obtained experimentally, and the costs were taken from typical chemical supplier price lists as of 1995–1996.

Pitches derived from both coal and petroleum and resins such as furfural alcohol and phenolic are most often used in conventional processes to produce C—C composites.

Resins such as furfural alcohol, phenolic, polyphenylene, epoxy novalac, and polyimide are economical cross-linked thermosetting polymers with useful carbon yields that are normally pyrolyzed in argon or nitrogen environments at temperatures approaching 1000° C. Furfural alcohol is a thin, wetting liquid that when catalyzed can be impregnated and then cured to form the resin within the preform. Phenolic resins are usually impregnated in solution with isopropyl alcohol. This reduces the yield of carbon in the preform as indicated in Table 1.

Pitches are mixtures of aromatic hydrocarbon compounds of wide molecular weight distribution. They are very inexpensive, can be melt-impregnated, and have a high carbon content. However, the pyrolysis carbon yield, at about 50 per cent by weight, is no better than the synthetic resins unless expensive high-temperature autoclave pyrolysis is employed. Moreover, pitch pyrolysis produces a variety of volatile compounds that are noxious, poisonous, and are known carcinogens.

Additionally, blends of pitch and resin materials are used as conventional carbon precursor materials. Examples of such blends are mixes containing 40 percent coal tar pitch and 60 per cent resin such as phenolic, furfural alcohol, or epoxy novalac.

The sugars listed in Table 1 were selected on the basis of their attractively low melting points for melt-impregnation as well as their ready availability. All sugars have a carbon to water ratio of unity, so their carbon content is 40 per cent by weight. Ribose and fructose are mononsaccharides. Sucrose is a disaccharide and may be the only disaccharide that forms a thin liquid at a temperature below which it rapidly decomposes. Other appropriate monosaccharides are glucose (with a melting point of about 150° C.) and galactose (with a melting point of about 170° C.).

Sucrose, or common table sugar, is inexpensive. Fructose and glucose are in the same cost range as the furfural alcohol and phenolic resins. Galactose is about $75/kg. Ribose is interesting because of its very low melting point, but is a costly special sugar.

Table 1 shows a rather low pyrolysis carbon yield for sucrose of about 25 per cent by weight. This was determined by heating sucrose in argon to 850° C. It is likely that the carbon yield of other sugars is about the same. Based on these data, the carbon density of the sugars is estimated to be about 0.40 g/cm$^3$. The relatively high specific gravity of the sugars and the fact that they are amenable to melt-impregnation compensate for their low carbon yield to some degree, raising the carbon density to a value approximating that of a solution impregnated phenolic.

Sugar Pyrolysis

The key advantage of the sugars over the traditional matrix precursor impregnants is their decomposition to form carbon at low temperatures. Table 1 shows that ribose and fructose are almost totally decomposed at 325° C. Plots of weight loss versus time at various temperatures for ribose, fructose, and sucrose are presented in FIG. 1. In performing the experiments used to obtain the data plotted in FIG. 1, and in conducting subsequent melt-impregnation and pyrolysis experiments, it was found that heating to as high as 350° C. in air produces no detrimental oxidation.

FIG. 1 shows that rapid decomposition of all of the sugars starts at about 200° C. and that at 350° C. are all close to being fully decomposed. This suggests that most, if not all, of the C—C densification can be accomplished by heating to low temperatures in air without using a special or protective environment. The shrinkage that occurs during pyrolysis produces a matrix that is cracked around the rigid fibers in the preform and the cracks are then filled on subsequent reimpregnation.

Because the sugars release gases and are converted from a liquid to a solid by the pyrolysis, frothing occurs during the process. This tends to compromise the effectiveness of melt-impregnation by bubbling the thickening liquid out of the carbonaceous fiber preform, yielding a porous carbon matrix. Pores in the matrix may or may not be filled by subsequent impregnation depending upon whether they are open or isolated. Rapid heating to temperatures above about 200° C. exaggerates the frothing, while it has been found that subjecting the melt-impregnated preforms to extended periods of isothermal pyrolysis at lower temperatures, for example, for periods of between about 17 hours to about 24 hours at about 95° C. to about 200° C., in various combinations and as exemplified in FIG. 1, minimize the problem. By subjecting a preform to "isothermal pyrolysis" it is generally meant to mean maintaining a temperature profile within about plus or minus 10° C. of a selected temperature. Additionally, in contrast to the use of conventional pressurization techniques, polymerizing and cross-linking the sugars under heat in the presence of a catalyst is disclosed as a novel solution to minimize or prevent this frothing effect.

Even though fructose and ribose melt at about 103° C. and 90° C., respectively, their melts are quite stable, and temperatures in the 160° C. to 190° C. range are required to produce sufficient decomposition and gas release to mitigate frothing at higher temperatures. The same is true of sucrose, which melts at about 170° C. Sucrose is somewhat unique in that it can be melted and then the desired low temperature release of gases can be accomplished below its melting point.

It is emphasized that a large number of different sugars would be appropriate for the process herein disclosed and described. For example, monosaccharides, which includes ribose, fructose, glucose, galactose, and mannose would all be suitable carbon sources. Additionally, disaccharides, which include sucrose and maltose, are also appropriate.

Sugar Melt-Impregnation and Pyrolysis Experiments

To demonstrate the preferred processing methodology for obtaining high-density C—C composites by the process of the present invention, several experiments were performed. In the first experiments, thin two-dimensional preforms about 1.6 mm thick, composed of about 40 per cent by volume HM carbon fiber yarns with a braid angle of about 45°, available from Techniweave, Inc., were densified by multiple cycles of sugar melt-impregnation and pyrolysis. The melt-impregnations were performed by burying the small preforms in a container filled with sugar granules or power and then heating above the sugar melting point so that the molten sugar penetrates the pores, or interstices, within the porous carbonaceous fiber preform. Melt-impregnation using sugar solutions in water or other appropriate solvents is also possible but is less efficient. For air, vacuum, granular, powder, or solution melt-impregnations of the preform, any suitable container that is inert to the sugar during thermal processing, such as an aluminum foil pan, is adequate. Ribose melt-impregnations were performed in vacuum, while most of the sucrose and fructose melt-impregnations were conducted by heating in air at ambient pressure. Except where indicated, all pyrolysis was conducted by heating in air.

Heating schedules for pyrolysis followed a general scheme of heating by any adequate method, such as a hot plate, for prolonged period of 17 to 24 hours at 95° C. to 200° C., one hour at 190° C. to 210° C., one hour at 225° C. to 250° C., one hour at 300° C. to 310° C., and, in some cases, 0.25 hour exposures at 325° C. to 360° C.

Melt-impregnations at about 175° C. in air using sucrose worked, but were the least effective. Knowing the weight increase and density of sucrose, it was calculated that only about half the available pores in the preform were filled in the first melt-impregnation. The sucrose melts were fluid and wet the carbon fibers quite well. However, the viscosity increased rapidly at higher temperatures due to decomposition. Melt-impregnation trials with maltose, which melts at about 200° C., were unsuccessful because the melt had a rather high initial viscosity and thickened rapidly.

TABLE 1

Comparison of Resin and Pitch Impregnant Characteristics with Those of Three Appropriate Sugars

| Name | Formula | Melting Point (°C.) | Specific Gravity (g/cm$^3$) | Carbon Content (wt %) | Pyrolysis Carbon Yield (wt %) | Carbon Density (g/cm$^3$) | Decomposition at 325° C. (wt %) | Small Quantity Cost ($/kg) |
|---|---|---|---|---|---|---|---|---|
| Furfural Alcohol Resin | $(C_9H_8O_2)_n$ | Dec. | 1.45 | 73 | 50<br>38[a] | 0.72<br>0.55[a] | 12 | 30 |
| Phenolic Resin | $(C_{13}H_{12}O_2)_n$ | Dec | 1.35 | 78 | 50<br>31[b] | 0.68<br>0.42[b] | 11 | 20 |
| Coal or Petroleum Pitch | $C_xH_y$ mixtures | 100–120 | 1.25–1.35 | >90 | 50 | 0.66 | 26 | 1 |
| D-Ribose | $C_5H_{10}O_5$ | 90–100 | — | 40 | — | — | 73 | 470 |

TABLE 1-continued

Comparison of Resin and Pitch Impregnant Characteristics with Those of Three Appropriate Sugars

| Name | Formula | Melting Point (°C.) | Specific Gravity (g/cm³) | Carbon Content (wt %) | Pyrolysis Carbon Yield (wt %) | Carbon Density (g/cm³) | Decomposition at 325° C. (wt %) | Small Quantity Cost ($/kg) |
|---|---|---|---|---|---|---|---|---|
| D-Fructose | $C_6H_{12}O_6$ | 103 | 1.66 | 40 | — | — | 68 | 15 |
| D-Sucrose | $C_{12}H_{22}O_{11}$ | 165–175 | 1.59 | 40 | 25 | 0.40 | 62 | 1 |

[a]Reflects 25 wt % loss upon polymerization.
[b]Based on using 62 wt % phenolic in solution for impregnation.

Melt-impregnations using fructose at 150° C. to 160° C. and ribose at about 100° C. were much more effective than the sucrose melt-impregnations. In air at ambient pressure, fructose filled about 75 per cent of the pores in the first melt-impregnation. A vacuum melt-impregnation using fructose produced 95 per cent filling. Vacuum melt-impregnations using ribose were also about 95 per cent effective. Both of these monosaccharides have very fluid and wetting melts. Boiling under vacuum can be a problem with both fructose and ribose so an ample quantity of sugar must be used. Once melting occurs, the pressure should be immediately increased.

Three cycles of melt-impregnation and pyrolysis appeared to accomplish as much densification as possible, regardless of the sugar being used. Three cycles of vacuum melt-impregnation and pyrolysis increased the weight of the ribose sample by about 38 per cent, while additional processing provided little further increase. The three cycle increase with fructose was 45 per cent, even though less efficient ambient pressure melt-impregnations in air were used.

The bulk density of the fructose sample increased from about 0.70 g/cm³ to 1.04 g/cm³. After three cycles, the sample had a fiber volume of 40 per cent and a matrix volume of 23 per cent. The volume of pores decreased from 60 per cent in the preform to 37 per cent in the composite.

In a final experiment, densification of the fructose sample was enhanced after three cycles by a furfural alcohol resin impregnation, pyrolysis at 850° C. in argon, and then a fourth fructose impregnation and pyrolysis. The sample was vacuum impregnated with catalyzed furfural alcohol and the furfural alcohol was cross-linked at 150° C. in air. Following the 850° C. argon heating, the sample was given a final fructose impregnation and pyrolysis cycle. This brought the sample bulk density to 1.23 g/cm³ and reduced the pore volume to about 26 per cent, Based on the carbon yield of the furfural alcohol resin, three conventional 850° C. resin cycles would have produced about the same result as the combination of the four fructose cycles and one resin cycle.

The experiments described above demonstrate that fructose and ribose are preferred as impregnants over sucrose, and that the less expensive, but higher melting-point fructose is as effective as ribose for impregnation and pyrolysis densification processing of C—C composites. The experiments also showed that the fructose processing was not as effective as the traditional method of using furfural alcohol. One reason for this is that less-efficient ambient pressure impregnation was used in the fructose cycles. Effective fructose vacuum impregnation was demonstrated and is expected to improve the efficiency of fructose processing.

Thus, in accordance with the invention, there has been provided an improved method for fabricating C—C composites by repeated cycles of sugar melt-impregnation and low temperature pyrolysis in air. In the described preferred embodiment, this process consists of melt-impregnating a porous carbonaceous fiber preform with a sugar in either air or vacuum followed by low-temperature pyrolysis in air. It is contemplated that, consistent with the scope of this disclosure, chemical polymerization and cross-linking of the sugar under heat in the presence of a catalyst will be an effective aid in minimizing or even preventing undesirable frothing. Additionally, a hybrid process combining sugar impregnation and pyrolysis with furfural alcohol impregnation and pyrolysis is shown to enhance the densification over the use of sugar impregnation and pyrolysis alone. It is noted that any suitable carbon precursor material, including resins, pitches, and blends of resins and pitches would be effective for use in the hybrid process herein disclosed.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated.

What is claimed is:

1. A method of fabricating a carbon-carbon composite, comprising the following steps:
    (a) melt-impregnating a carbonaceous fiber preform with sugar in air or vacuum;
    (b) pyrolyzing said melt-impregnated carbonaceous fiber preform; and
    (c) repeating steps (a) and (b) until the desired density of said carbon-carbon composite is achieved.

2. A method of fabricating a carbon-carbon composite according to claim 1, wherein said melt-impregnation of a carbonaceous fiber preform is accomplished in vacuum.

3. A method of fabricating a carbon-carbon composite according to claim 1, wherein said melt-impregnation of a carbonaceous fiber preform is accomplished in air at ambient pressure.

4. A method of fabricating a carbon-carbon composite according to claim 1, wherein said sugar is granular.

5. A method of fabricating a carbon-carbon composite according to claim 1, wherein said sugar is suspended in solution.

6. A method of fabricating a carbon-carbon composite according to claim 1, wherein said sugar is fructose.

7. A method of fabricating a carbon-carbon composite according to claim 1, wherein said sugar is ribose.

8. A method of fabricating a carbon-carbon composite according to claim 1, wherein said sugar is sucrose.

9. A method of fabricating a carbon-carbon composite according to claim 1, wherein frothing is minimized by the use of extended periods of isothermal pyrolysis.

10. A method of fabricating a carbon-carbon composite according to claim 1, wherein frothing is minimized by polymerizing and cross-linking said sugars under heat in the presence of a catalyst.

11. A method of fabricating a carbon-carbon composite, comprising the following steps:
- (a) melt-impregnating a carbonaceous fiber preform with fructose at a temperature of about 150° C. to about 160° C. in vacuum;
- (b) pyrolyzing said melt-impregnated carbonaceous fiber preform by heating in air for from about 17 hours to about 24 hours at a temperature of from about 95° C. to about 200° C., then heating for about one hour at a temperature of from about 190° C. to about 210° C., then heating for about one hour at a temperature of from about 225° C. to about 250° C., and then heating for about one hour at a temperature of from about 300° C. to about 310° C.;
- (c) repeating steps (a) through (b) two additional times;
- (d) further impregnating said melt-impregnated carbonaceous fiber preform with catalyzed furfural alcohol in vacuum;
- (e) cross-linking said catalyzed furfural alcohol at a temperature of about 150° C. in air for from about one hour to about two hours;
- (f) pyrolyzing said further impregnated carbonaceous fiber preform at a temperature of about 850° C. in argon for from about one hour to about ten hours; and
- (g) repeating steps (a) through (b) one additional time.

12. A method of fabricating a carbon-carbon composite, comprising the following steps:
- (a) melt-impregnating a carbonaceous fiber preform with sugar;
- (b) pyrolyzing said melt-impregnated carbonaceous fiber preform;
- (c) repeating said steps (a) through (b) as desired;
- (d) further impregnating said melt-impregnated carbonaceous fiber preform with a carbonaceous resin or pitch;
- (e) pyrolyzing said further impregnated carbonaceous fiber preform;
- (f) repeating said steps (d) through (e) as desired;
- (g) repeating said steps (a) through (f), as desired, until the desired density of said carbon-carbon composite is achieved.

13. A method of fabricating a carbon-carbon composite according to claim 12, wherein said melt-impregnation of a carbonaceous fiber preform with sugar is accomplished in vacuum.

14. A method of fabricating a carbon-carbon composite according claim 12, wherein said melt-impregnation of a carbonaceous fiber preform with sugar is accomplished in air at ambient pressure.

15. A method of fabricating a carbon-carbon composite according to claim 12, wherein said sugar is granular.

16. A method of fabricating a carbon-carbon composite according to claim 12, wherein said sugar is suspended in solution.

17. A method of fabricating a carbon-carbon composite according to claim 12, wherein said sugar is fructose.

18. A method of fabricating a carbon-carbon composite according to claim 12, wherein said sugar is ribose.

19. A method of fabricating a carbon-carbon composite according to claim 12, wherein said sugar is sucrose.

20. A method of fabricating a carbon-carbon composite according to claim 12, wherein frothing is minimized by the use of extended periods of isothermal pyrolysis.

21. A method of fabricating a carbon-carbon composite according to claim 12, wherein frothing is minimized by polymerizing and cross-linking said sugars under heat in the presence of a catalyst.

* * * * *